United States Patent [19]

Amitay et al.

[11] Patent Number: 4,606,054
[45] Date of Patent: Aug. 12, 1986

[54] CROSS-POLARIZATION INTERFERENCE CANCELLATION

[75] Inventors: Noach Amitay, Tinton Falls; Lawrence J. Greenstein, Edison, both of N.J.

[73] Assignee: AT&T Bell Laboratories, Murray Hill, N.J.

[21] Appl. No.: 704,069

[22] Filed: Feb. 21, 1985

[51] Int. Cl.⁴ .............................................. H04B 1/10
[52] U.S. Cl. ................................ 375/102; 343/362; 375/14; 455/60; 455/295; 455/306
[58] Field of Search ................ 455/60, 295, 303, 305, 455/306; 375/13-15, 39, 102; 370/6, 20; 343/361, 362

[56] References Cited

U.S. PATENT DOCUMENTS 3,735,266  5/1973  Amitay .
4,112,370  9/1978  Monsen ................................. 375/14

FOREIGN PATENT DOCUMENTS 0065499  11/1982  European Pat. Off. ............ 343/361

OTHER PUBLICATIONS

M. L. Steinberger, "Design of a Terrestrial Cross Pol Canceler", 1982 IEEE, pp. 2B.6.1-2B.6.5.
Y. Bar-Ness, "Cross-Coupled Boot-Strapped Interference Canceler", 1981 IEEE, pp. 292-295.
D. H. Brandwood, "Cross-Coupled Cancellation System for Improving Cross-Polarisation Discrimination", pp. 41-45.

Primary Examiner—Marc E. Bookbinder
Attorney, Agent, or Firm—David R. Padnes

[57] ABSTRACT

A canceller for eliminating the cross-polarization interference in incoming signals having polarizations which are orthogonal to one another is proposed. Each incoming signal is coupled to an associated adaptive filter. Each filter output is then summed with an associated one of the incoming signals which has a polarization orthogonal to that of the filter input signal. The signal sums formed are the canceller output signals. Adjustment of the adaptive filters so as to cancel the cross-polarization interference in each received signal is made in response to the incoming signals and the canceller output signals at selected times. During these times, circuitry for adjusting the adaptive filters examines spectral tones formed by the incoming signals and the canceller output signals.

11 Claims, 7 Drawing Figures a) SEQUENCE 1 (P=4)

b) SEQUENCE 2 (P=8)

CROSS-POLARIZATION INTERFERENCE CANCELLATION

TECHNICAL FIELD

The present invention relates to interference cancellation and, more particularly, to an arrangement for cancelling the cross-coupling which occurs between signals transmitted on two orthogonal polarizations.

BACKGROUND OF THE INVENTION

There has been a rapid growth of terrestrial and satellite communication systems in recent years. This growth has been accompanied by an increasing need for systems with higher information-carrying capacities within limited frequency bands. Since free space enables the independent and simultaneous transmission of electromagnetic waves having polarizations which are orthogonal to one another within the same frequency band, the use of orthogonal polarizations can double the information-carrying capacity of a communications link. However, rainfall, imperfect antenna alignment, multipath fading, terrain reflections and atmospheric phenomenon diminish the isolation between the orthogonally polarized signals. This results in cross-coupling interference. Consequently, at the system receiver, information carried by one designated polarization is corrupted with information carried by the orthogonal polarization. This cross-coupling interference can degrade the quality of the received information below that which is acceptable in many telecommunications applications.

Several techniques for cross-polarization interference cancellation have been proposed. See, for example, an article by M. L. Steinberger entitled "Design of a Terrestrial Cross-Pol. Canceller", *International Conference on Communications*, June 13-17, 1982, Philadelphia, Pa., and the canceller suggested in the articles of Y. Bar-Ness et al, "Cross-Coupled Boot Strapped Interference Canceller", *IEEE 1981 International Symposium Digest, Antennas and Propagation*, Vol. 1, pp. 292-5, and D. Brandwood, "Cross-Coupled Cancellation System for Improving Cross-Polarisation Discrimination", *International Conference on Antennas and Propagation*, Part 1, pp. 41-5, 1978. While the proposed schemes referred to in these articles should provide satisfactory cross-polarization interference cancellation in certain situations, they may provide poor performance during frequency-selective fading and are not usable in nonregenerative repeaters. In addition, the effectiveness and speed of the cancellation process are insufficient for certain system applications and modulation formats.

SUMMARY OF THE INVENTION

Pursuant to the present invention, a cross-polarization interference canceller is proposed wherein each orthogonally polarized received signal is coupled into an associated adaptive filter. Each filter output is then summed with an associated one of the received signals having a polarization orthogonal to that of the filter input signal. The two sums thus formed are the cross-polarization canceller output signals. Adjustment of each filter to provide the appropriate amount of cancellation is made in response to the orthogonally polarized received signals and the canceller output signals at selected times. In accordance with an aspect of the present invention, the filters are adjusted in response to spectral tones that are generated by the transmission of predetermined orthogonally polarized signals and spectral tones appearing as the canceller output signals at selected times. This adjustment rapidly cancels the cross-polarization interference at each spectral tone frequency. In addition, the examination of the spectral tones is unaffected by many fading conditions, can be employed with different signal modulation formats and can be used at nonregenerative repeater locations, as baseband information signal processing is not required.

DETAILED DESCRIPTION

Figure 1:
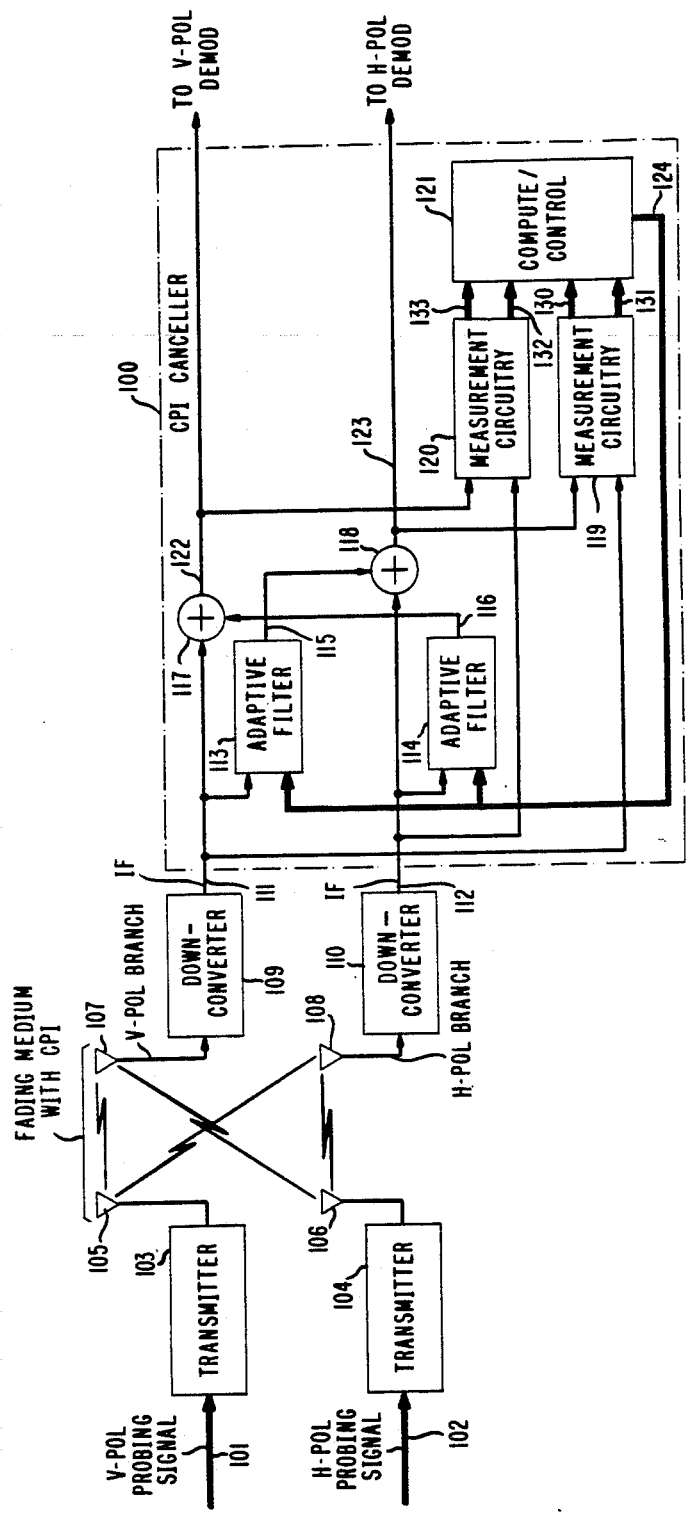
FIG. 1 is an illustrative system incorporating a cross-polarization interference canceller in accordance with the present invention.

The operation of a cross-polarization interference canceller 100 will be described in reference to the illustrative digital communication system shown in FIG. 1. At the signal transmitting end, baseband digital information signals on buses 101 and 102 respectively modulate the amplitudes of quadrature-related carrier signals within transmitters 103 and 104 using the wellknown quadrature amplitude modulation (QAM) technique and are thence coupled to transmitting antennas 105 and 106. The QAM signals propagating from antennas 105 and 106, which can, of course, be the same physical antenna, have polarizations which are orthogonal to one another. For purposes of simplicity, the polarizations of the signals from antennas 105 and 106 are respectively designated as vertical and horizontal. The horizontally polarized (H-POL) and vertically polarized (V-POL) signals propagate through free space, which is a medium subject to frequency-selective signal fading and cross-polarization interference (CPI). The incoming signals are coupled through receiving antennas 107 and 108, which can be the same physical antenna, and thence to down-converters 109 and 110, respectively. Down-converters 109 and 110 provide frequency translation of the received signals to some intermediate frequency designated as IF. Due to the performance of CPI, the V-POL signal coupled through down-converter 109 to lead 111 is corrupted by a signal component originating from the H-POL signal transmitted from antenna 106. Similarly, the H-POL signal coupled through down-converter 110 to lead 112 includes an undesired signal component originally part of the V-POL signal transmitted from antenna 105.

Canceller 100 reduces the CPI interference within the V-POL signal on lead 111 by coupling the H-POL signal on lead 112 through adaptive filter 114 and then adding the filter output on lead 116 and the V-POL signal via summer 117. In similar fashion, the CPI interference in the H-POL signal on lead 112 is removed by coupling the V-POL signal through adaptive filter 113 and then adding the filter output signal on lead 115 and the H-POL signal via summer 118. The signal sums generated and appearing on leads 122 and 123 are the canceller output signals. These output signals are respectively coupled to V-POL and H-POL demodulators wherein the baseband digital information signals are processed.

Each adaptive filter 113 and 114 is of conventional design and includes a tapped delay line, multipliers for multiplying the signal at each tap by a tap-weight coefficient, which is a complex number, and a combiner which sums the weighted signals formed by the multipliers. Accordingly, each adaptive filter forms a weighted sum of time-shifted versions of its input signal.

Measurement circuitry 119 and 120 and compute/control circuit 121, respectively, adjust the tap-weight coefficients within adaptive filters 113 and 114 to reduce or effectively cancel the CPI in the canceller output signals on leads 122 and 123. Measurement circuitry 119, connected to leads 111 and 123, examines the V-POL received signals and the H-POL canceller output signals at selected times. Similarly, measurement circuitry 120 examines the H-POL received signals on lead 112 and the V-POL canceller output signal on lead 122 at selected times. These selected times correspond to the times that predetermined digital signal sequences, hereinafter referred to as probing sequences, are supplied to transmitters 103 and 104 via buses 101, 102 and thence radiated as H-POL and V-POL signals using antennas 105 and 106. The results of these examinations are coupled to compute/control circuit 121 via buses 130-133. Compute/control circuit 121 then determines the appropriate tap-weight coefficient values for adaptive filters 113 and 114 and supplies these values on bus 124.

Figure 2:
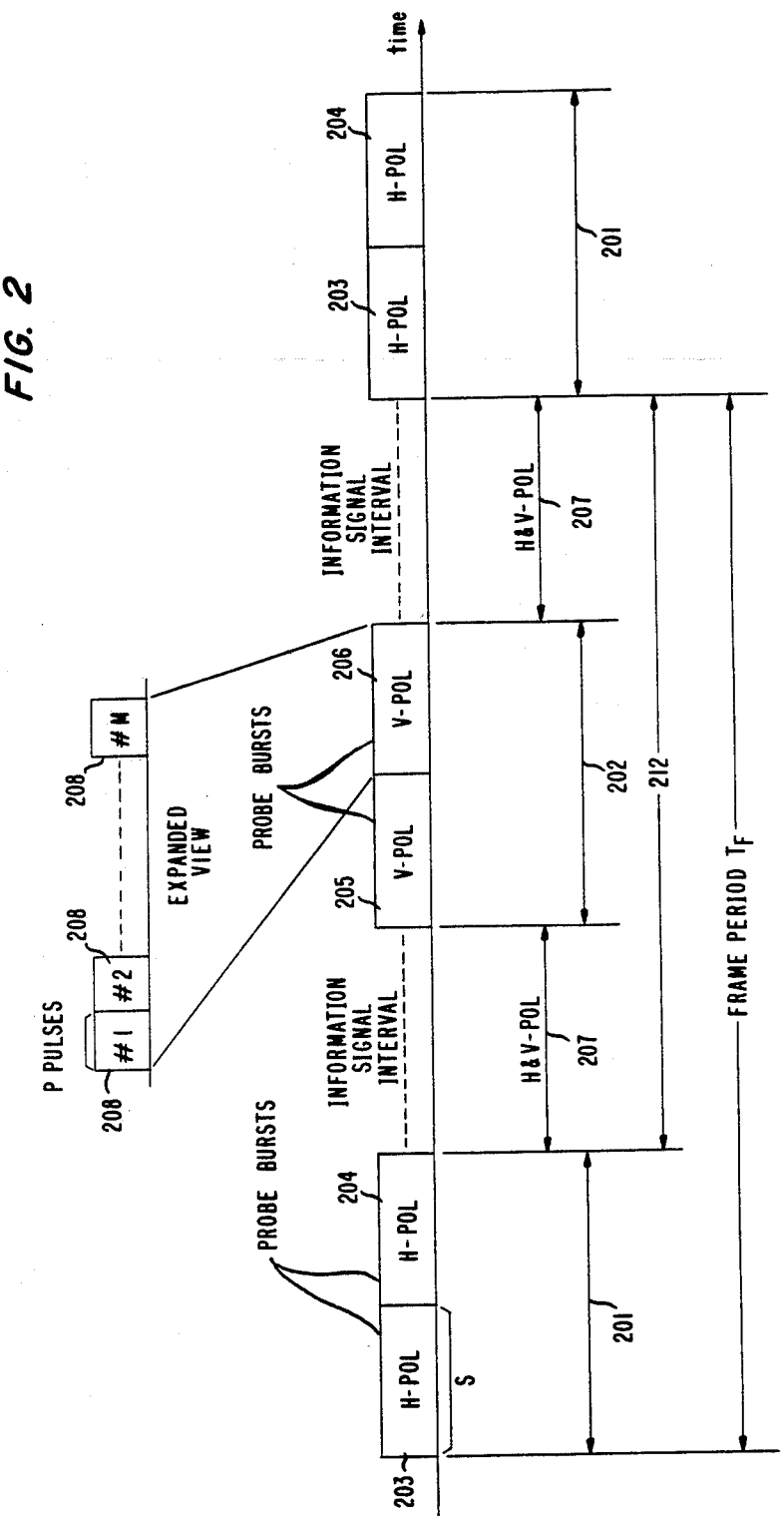
FIG. 2 is an illustrative signal format for use with the canceller of FIG. 1.

Refer now to FIG. 2 which depicts an illustrative probing sequence format. The probing sequences 201 and 202 are used, respectively, to adjust the tap-weight coefficients of adaptive filters 114 and 113. Each sequence comprises two consecutive s-second bursts of digital signals, wherein sequence 201 includes bursts 203, 204 and sequence 202 includes burst 205, 206 (the time scale in FIG. 2 is not to scale, i.e., s is a much smaller fraction of the full frame period, $T_F$, than shown). These probing sequences utilize both polarizations. The probing sequence format includes two consecutive H-POL bursts 203, 204, followed by information signals on both polarizations during interval 207, followed by two consecutive V-POL bursts 205, 206 and so on. The four sequential probing bursts 203, 204, 205, and 206 are identical, i.e., they contain identical sequences of digital signals. The illustrated transmission of H-POL and V-POL probing sequences in separate time intervals advantageously avoids CPI, which can degrade the examination of the sequences by measurement circuitry 119 and 120.

A typical probe burst (expanded view in FIG. 2) includes M periodic sub-bursts 208 of P digital signals each. This produces spectral tones at spacings of 1/PT where 1/T is the digital symbol rate of the communication system (the spectral tone width is nonzero because of the finiteness of the burst duration). The P-symbol pattern is chosen to achieve reasonably uniform spectral tone amplitudes at N frequencies within the channel bandwidth. As described, during the transmission of a probe burst in one polarization, "all-zero data" is sent in the other polarization. By "all-zero data", we mean that the data value in each symbol period is 0+j0. While use of zero-data eliminates CPI problems during the probing sequence intervals, an alternative approach can be used if zero-data does not lie in the signal constellation generated by the particular modulation format. For example, during the transmission of a probing burst in one polarization, resulting in the generation of a set of N spectral tones, we can send a burst of permissible symbols in the other polarization so as to produce a frequency-interleaved set of spectral tones. The latter set of spectral tones can be eliminated by the measurement circuitry using filtering. For purposes of simplicity, however, this approach will not be elaborated on and the discussion hereinbelow will proceed with the "all-zero data" concept.

To give an example, assume a 4 GHz system, with $1/T = 15$ megabaud in a total channel bandwidth of 20 MHz. If we choose $P=4$, $M=50$ and $T_F=50$ milliseconds, the burst duration, $sT = MPT$, is then 13.33 microseconds. If we assume a "dead time" of 3.33 microseconds (50 symbol periods) just before each double burst, the probing sequence duty cycle is 0.12%.

Figure 3:
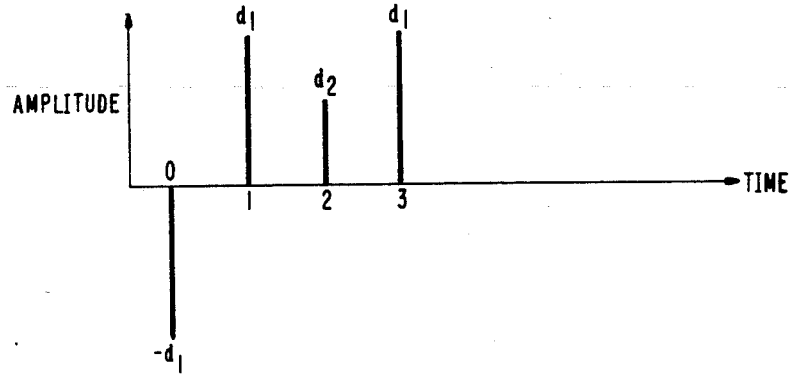
FIG. 3 is a diagram of several illustrative digital sequences which can form the sub-bursts 208 of FIG. 2.
Figure 3:
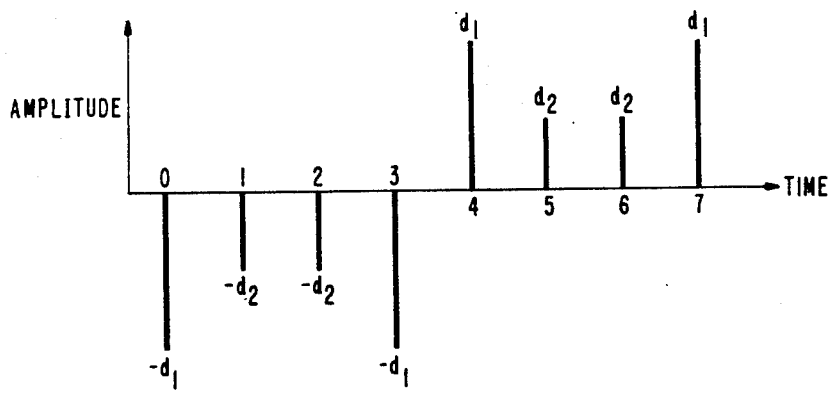

FIG. 3 shows two illustrative probing sub-burst sequences for use in the format of FIG. 2. In sequence 1, $P=4$, $M=50$ for an H-POL or V-POL probe, and each sub-burst comprises digital signal values $d_1$, $d_2$ and the inverse of $d_1$, $-d_1$. The values are transmitted in the sequence $-d_1$, $d_1$, $d_2$, $d_1$ to generate five nonzero spectral tones at 0, $\pm 3.75$ and $\pm 7.5$ MHz from the center of the transmission channel. All other frequencies are suppressed because of the bandlimited nature of transmitted pulses. In sequence 2, $P=8$ and $M=25$ for an H-POL or V-POL probe, and each sub-burst 208 comprises signal values $d_1$, $-d_1$, $d_2$, $-d_2$, which are transmitted in the sequence $-d_1$, $-d_2$, $-d_2$, $-d_1$, $d_1$, $d_2$, $d_2$, $d_1$ to generate six nonzero line components at $\pm 1.875$, $\pm 5.625$ and $\pm 9.375$ MHz. For both sequences, all nonzero spectral tones lie within the channel bandwidth, i.e., $-10$ MHz $< f_n < 10$ MHz, where $f_n$ is the frequency of any of the N nonzero spectral tones. Typical design numbers for the complex data values $d_1$ and $d_2$ are $3(1+j)$ and $(1+j)$, respectively, for a typical 16-QAM modulation format, and are $5(1+j)$ and $3(1+j)$, respectively, for a typical 64-QAM modulation format.

Figure 4:
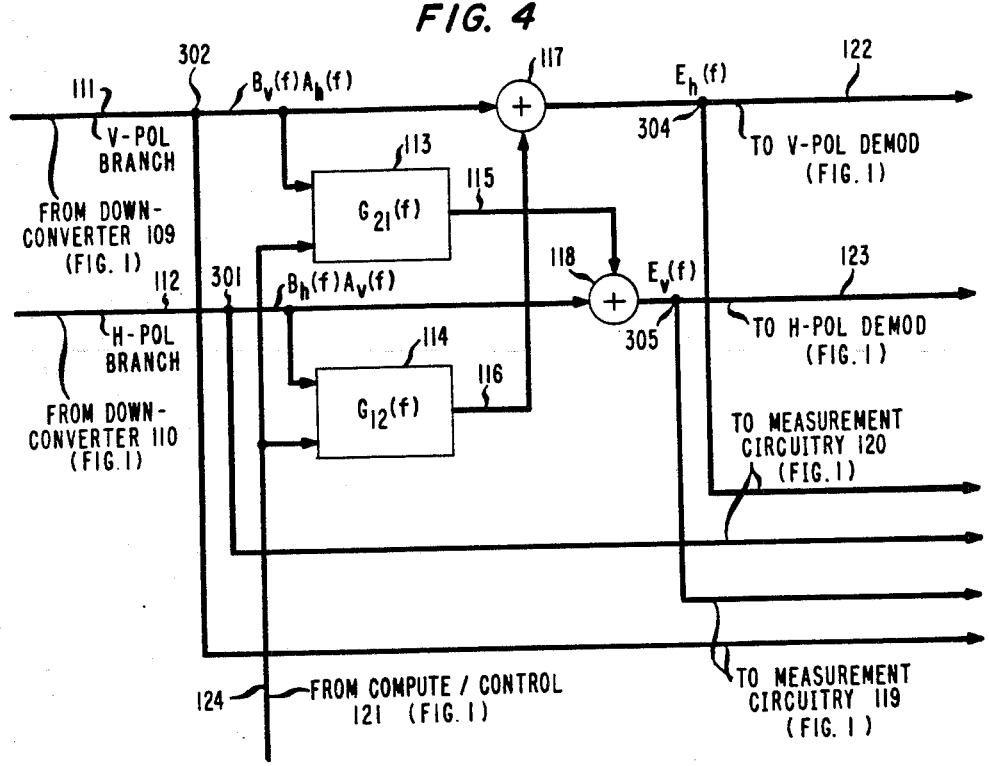
FIG. 4 is a block diagram of a portion of the canceller of FIG. 1 which depicts the signals at certain points therein.

FIG. 4 shows a portion of canceller 100 and the signals present at selected nodes. The two functions $G_{12}(f)$ and $G_{21}(f)$ represent the transfer functions of adaptive filters 114 and 113, respectively. The co-polarization function $B_h(f)$ is the transmission channel response between the transmitted H-POL signal and node 301; cross-polarization function $A_v(f)$ is the transmission channel response between the transmitted V-POL signal and node 301; co-polarization function $B_v(f)$ is the transmission channel response between the transmitted V-POL signal and node 302; and cross-polarization function $A_h(f)$ is the transmission channel response between the transmitted H-POL signal and node 302. Or, equivalently, $B_h(f)$ and $B_v(f)$ are the desired signal responses into nodes 301 and 302 while $A_h(f)$ and $A_v(f)$ are the interfering or undesired signal responses into these nodes. $E_h(f)$ and $E_v(f)$ are the error signal responses at nodes 304 and 305, respectively.

While there may be time delays present between node 302 and summer 117 and between node 301 and summer 118, for purposes of illustration it will be assumed that such delays are absent. Such delays could be used to compensate for delays within adaptive filters 113 and 114.

To adjust the tap-weight coefficients in adaptive filters 113 and 114 so as to null the cross-pol responses $A_v(f)$ and $A_h(f)$ at the spectral tone frequencies, frequency responses $B_v(f)$, $B_h(f)$, $E_v(f)$ and $E_h(f)$ are measured at these frequencies. Nulling the cross-pol responses is equivalent to making $E_h(f)=0$ at node 304 and $E_v(f)=0$ at node 305. For simplicity, only the H-POL measurements, i.e., $B_h(f)$ at node 301 and $E_h(f)$ at node 304, will be described in detail; the measurements for the V-POL signals are analogous.

Referring to FIG. 4, it should be observed that $$E_h(f) = A_h(f) + G_{12}(f) B_h(f), \quad (1)$$

during the transmission of an H-POL sequence. To achieve the condition $E_h(f)=0$ across the band requires that $$G_{12}(f) = -\frac{A_h(f)}{B_h(f)} \quad (2)$$

at all in-band frequencies. If $A_h(f)/B_h(f)$ is a reasonably smooth function of frequency, adjusting $G_{12}(f)$ so as to null $E_h(f)$ at several discrete in-band frequencies should provide effective CPI cancellation.

Measurement circuitry 119 and 120 performs all the measurements by connecting nodes 301, 302, 304 and 305 in the proper sequence. For example, consider the probing sequence format of FIG. 2 along with FIGS. 1 and 4. During probe burst 203, measurement circuitry 120 is connected to node 301 and it measures $B_h(f)$ at the N designated spectral tone frequencies. During burst 204, circuitry 120 is connected to node 304 and it measures $E_h(f)$ at the same N frequencies. During interval 212, compute/control circuitry 121 uses the measurements to determine the tap-weight coefficients that will make $E_h(f)=0$ at the N spectral tone frequencies generated by the H-POL bursts 203 and 204. To set the tap-weight coefficients thus determined, it is preferable to have a "dead time" set aside just before the end of interval 212 when no information signals are transmitted so that the changing adaptive filter response doesn't impair data detection during the transition. Similarly, measurement circuitry 119 measures $B_v(f)$ and $E_v(f)$ during bursts 205 and 206, respectively. Compute/control circuit 121 then determines the tap-weight coefficients of adaptive filter 113 which make $E_v(f)=0$ at the N spectral tone frequencies generated by bursts 205 and 206. This determination is made during an interval 212 following burst 206.

Each of the adaptive filters 113, 114 is an N-tap structure having delay $\tau$ between taps, with N typically lying in the range of 5 to 15 and $\tau << T_F$, where $T_F$ is the frame period. Using the mathematically convenient fiction that a negative delay $-T_d$ is incorporated into each filter, the delay to the output of the $m^{th}$ tap is:

$$\tau_m = -T_d + m\tau; \text{ where } m = 1, 2, \ldots N. \quad (3)$$

The goal of the measurement circuitry 119, 120 and compute/control circuit 121 is to set the N tap-weight coefficients or gains, $g_1, g_2 \ldots g_N$ of each adaptive filter so as to null the cross-pol response at each of N in-band frequencies, $f_1, f_2 \ldots f_N$, of the spectral tones generated by the probing sequences. To analyze the computation required, the following notation will be used:

$$G_n = G_{12}(f_n); n = 1, 2, \ldots N$$

and where $G_{12}$ is the transfer function of adaptive filter 114 and $G_n$ is the transfer function of this filter for the $n^{th}$ spectral tone.

$$b_n = B_h(f_n); n = 1, 2, \ldots N; \quad (4)$$

$$a_n = A_h(f_n); n = 1, 2, \ldots N; \quad (5)$$

and $$e_n = E_h(f_n); n = 1, 2, \ldots N \quad (6)$$

where $B_h(f_n)$ and $A_h(f_n)$ are the co-polarization and cross-polarization channel responses for the spectral tones generated by the H-POL probing sequences, $E_h(f_n)$ is the error signal response for these tones at node 304 in FIG. 4, $b_n$ and $a_n$ are the co-polarization and cross-polarization channel responses for the $n^{th}$ spectral tone in the H-POL probing sequence, and $e_n$ is the error signal response at node 304 for the $n^{th}$ spectral tone. In addition, the superscript (k) will be used as an index of the number of $T_F$-second frame periods from some time origin. Thus, for example, $e_n^{(k)}$ denotes the value of $e_n$ in the $k^{th}$ frame period from the arbitrary time origin. This notation will not be used with $a_n$ and $b_n$, however, because the transmission channel, for purposes of simplification, is regarded as quasi-static.

As discussed, to achieve $E_h(f)=0$ requires that $$G_{12}(f) = -\frac{A_h(f)}{B_h(f)}.$$

The best that can be accomplished with our scheme is $$G_n = -\frac{a_n}{b_n}; n = 1, 2, \ldots N. \quad (7)$$

That is, we can force $E_h(f)$ to zero at N frequencies, but cannot guarantee that $E_h(f)=0$ between these nulls.

Consider the tap gains $\{g_m\}$, $m=1, 2 \ldots N$ of adaptive filter 114 whose response is $G_{12}(f)$. It can be shown that $$G_n = \sum_{m=1}^{N} g_m e^{-j2\pi f_n \tau_m}; n = 1, 2 \ldots N \quad (8)$$

$$g_m = \sum_{m=1}^{N} W_{m,n} G_n; m = 1, 2 \ldots N, \quad (9)$$

where $W_{m,n}$ is the (m,n) element of the inverse of the N×N matrix whose (n,m) element is $e^{-j2\pi f_n \tau_m}$.

Given the N-point sets $\{f_n\}$ and $\{\tau_m\}$, the matrix W can be readily solved and stored permanently in a memory within compute/control circuitry 121 of FIG. 1. For the specific choice of N equally spaced spectral tones $f_{n+1} - f_n = \Delta f$ with $\tau = 1/N\Delta f$, equations (8) and (9) reduce to the discrete orthogonal Fourier transform pair with $$W_{m,n} = \frac{e^{j2\pi \frac{mn}{N}}}{N}.$$

Next, recalling that during bursts 204 of FIG. 2 the complex quantities $\{e_n\}$ are measured, this quantity for the $k^{th}$ frame period can be expressed as $$e_n^{(k)} = a_n + b_n G_n^{(k)}; \quad n = 1, 2, \ldots N \tag{10}$$

where $$G_n^{(k)} = \sum_{m=1}^{N} g_m^{(k)} e^{-j2\pi f_n \tau m}; \quad n = 1, 2, \ldots N. \tag{2}$$

Therefore, in terms of $a_n$, $b_n$ and $e_n^{(k)}$, the tap gains are $$g_m^{(k)} = \sum_{n=1}^{N} W_{m,n} \frac{e_n^{(k)} - a_n}{b_n}; \quad m = 1, 2, \ldots N$$

and if it is desired that $e_n^{(k+1)}=0$ for $n=1, 2 \ldots N$, the tap gains should be set so that $$g_m^{(k+1)} = -\sum_{n=1}^{N} W_{m,n} \frac{a_n}{b_n}; \quad m = 1, 2, \ldots N \tag{12}$$

Using recursive techniques, $g_m^{(k+1)}$ can be set even though $a_n$ is not measured. That is, we can write $$g_m^{(k+1)} = g_m^{(k)} - \sum_{n=1}^{N} W_{m,n} \frac{e_n^{(k)}}{b_n}; \quad m = 1, 2, \ldots N \tag{13}$$

It will be noted from equation (13) that the $g_m$s depend solely on ratios of the complex quantities $e_n/b_n$, $n=1, 2, \ldots N$ and the cross-pol response can be nulled at N frequencies in one period provided the complex quantities $a_n$ and $b_n$ do not substantially change. For a frame period such as 50 milliseconds, this is a reasonable expectation. It should, of course, be understood that equation (13) also holds for setting the tap gains of adaptive filter 113, where the complex quantities measured have a vertical polarization.

Figure 5:
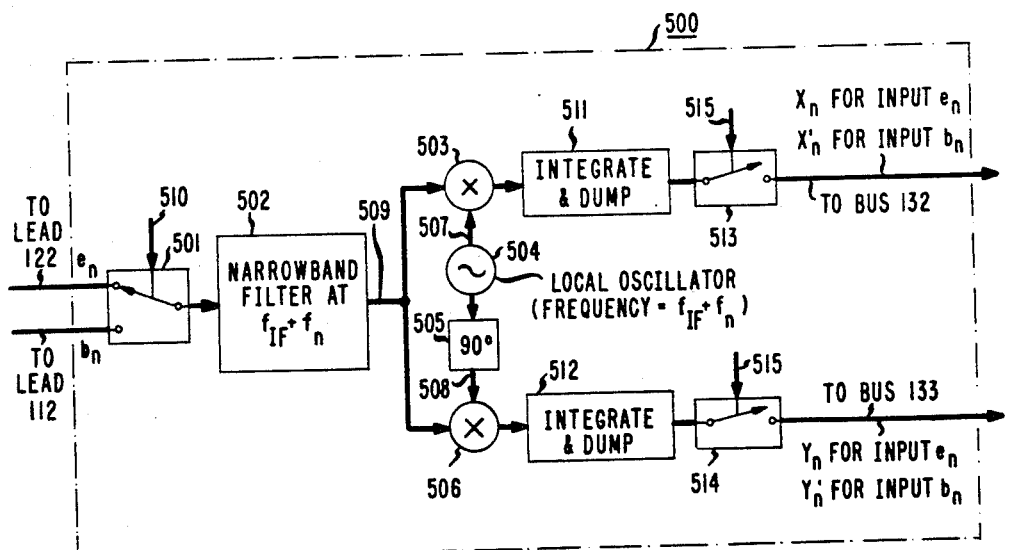
FIG. 5 is a schematic block diagram of a portion of the measurement circuitry within the canceller of FIG. 1.

The values of $e_n$ and $b_n$ are determined for each polarization and for each of the N frequencies by measurement circuitry 119 and 120. Measurement circuitry 119 and 120 each comprise N identical subcircuits 500 and one such subcircuit is shown in FIG. 5. Each subcircuit 500 of measurement circuitry 119 is connected to leads 111 and 123 and examines a different one of the N spectral tones of $e_n$ and $b_n$ generated by the V-POL probing sequence bursts. Similarly, each subcircuit 500 of measurement circuitry 120 is connected to leads 112 and 122 and examines a different one of the N spectral tones of $e_n$ and $b_n$ generated by the H-POL probing sequence bursts.

Refer now to FIG. 5, which shows a block-schematic diagram of a subcircuit 500 within measurement circuit 120 for examining the $n^{th}$ spectral tone, where n is 1 or 2 or ... N. Switch 501, regulated by a control signal on lead 510, alternatively toggles $b_n$ and $e_n$ to narrowband filter 502 during bursts 203 and 204 of FIG. 2, respectively. Filter 502 passes only the $n^{th}$ spectral tone at frequency $f_{IF}+f_n$ to demodulators 503 and 506. Demodulators 503 and 506 recover the quadrature-related components, plus or minus some arbitrary phase shift, of $e_n$ and $b_n$ using quadrature-related sinusoidal signals at frequency $f_{IF}+f_n$. These sinusoids are generated by local oscillator 504 and 90° phase shifter 505 and are supplied to demodulators 503 and 506 via leads 507 and 508, respectively. The arbitrary phase shift in the quadrature-related components, $X_n$, $Y_n$ of $e_n$ and the quadrature-related components $X'_n$, $Y'_n$ of $b_n$ arises because local oscillator 504 is not phase-locked to the signal on lead 509. This phase shift is of no concern and is not shown in the signal designation since the adjustment of the tap-weight coefficients is a function of the ratio of $e_n/b_n$ and, hence, the effect of the arbitrary phase shift is cancelled. The outputs of demodulators 503 and 506, which are amplitude-modulated pulses, are respectively coupled through integrate-and-dump circuits 511 and 512 and samplers 513 and 514 to buses 132 and 133. Each integrate-and-dump circuit averages the received signal values for the duration of a single probing sequence burst before passing this averaged value to a sampler. Samplers 513 and 514, respectively, controlled by a control signal on lead 515, couple the averaged signals during each of the H-POL probing sequence bursts to buses 132 and 133.

Figure 6:
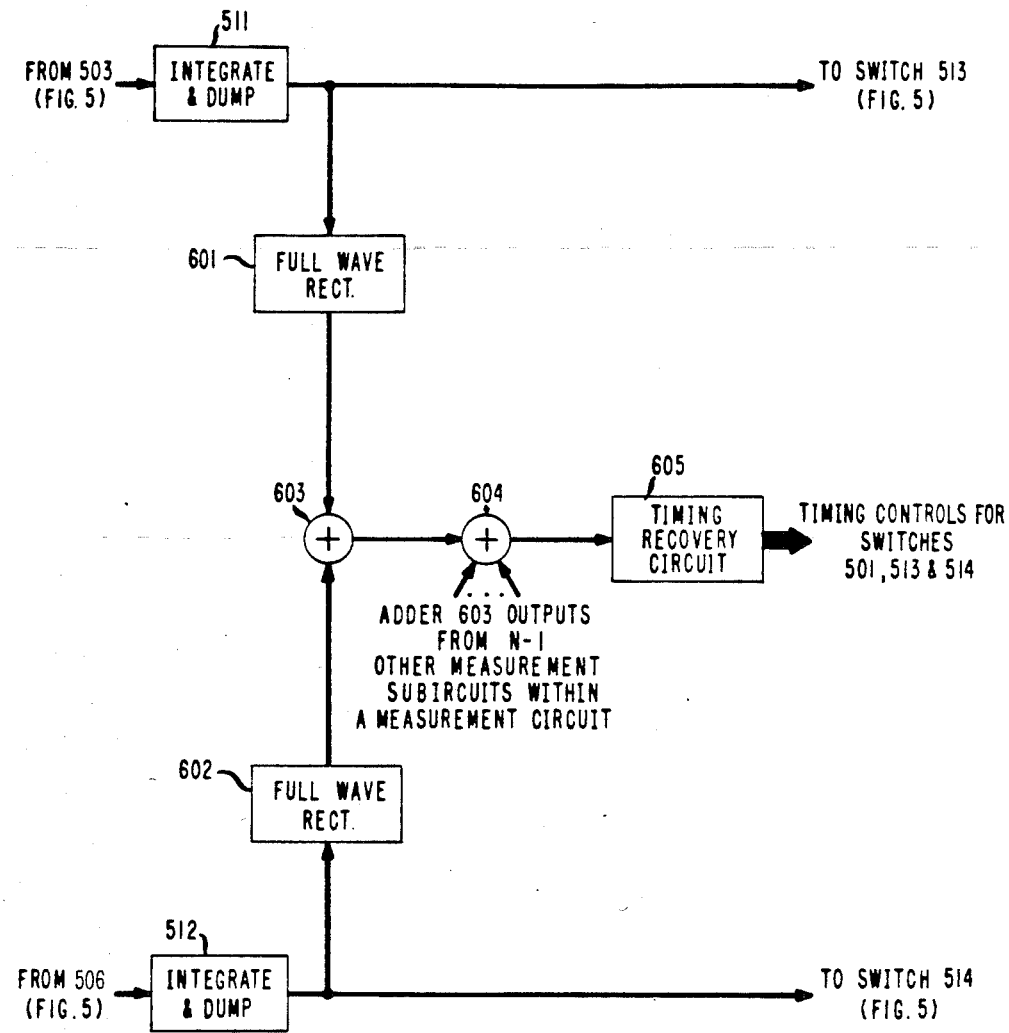
FIG. 6 is a schematic block diagram of circuitry added to measurement subcircuits 500 to provide timing control signals 510 and 515 in FIG. 5.

The timing control signal on lead 510, which coincides with the beginning of bursts 203 and 204, and the control signal on lead 515, which coincides with the ends of these bursts, can be communicated to the measurement circuitry within the receiver by a variety of well-known techniques. For example, these timing control signals could be sent over a wire path (not shown) which extends from the transmitting to the receiving end of the communications system of FIG. 1. A preferable approach, illustrated in FIG. 6, involves placing some added circuitry at the integrate-and-dump filter outputs of each measurement subcircuit, 500, to extract timing control signals for switches 501, 513 and 514. Each of the two such outputs in each measurement subcircuits will consist of periodic pulses, corresponding in time to the probing interval periods, with the intervening times containing low-level noiselike variations caused by random data. If the outputs of integrate-and-dump circuits 511 and 512 are respectively connected to full-wave rectifiers 601 and 602 and the rectifier outputs are summed via adder 603, a periodic unipolar pulse stream will be available for extracting timing controls for switches 501, 513 and 514. Also, whereas frequency-selective fading could cause the periodic pulse stream derived from any one such measurement subcircuit to be small, summing the pulse stream outputs of all N such measurement subcircuits before performing timing recovery via adder 604 avoids this problem. The signal sum provided by adder 604 can be applied to standard timing recovery circuit 605, well-known in the art, which incorporates appropriate delay elements and generates the timing control signals for switches 501, 513 and 514.

The subcircuits 500 within measurement circuitry 119 are identical, except that they respectively measure the quantities $e_n$ and $b_n$ on leads 123 and 111 during V-POL probing bursts 205 and 206 of FIG. 2. These complex quantities, which are sent via buses 130 and 131 to compute/control circuit 121, are used to adjust the tap-weight coefficients of adaptive filter 113. The circuitry of FIG. 6 can also be used to generate the timing control signals on leads 510 and 515 for subcircuits 500 within measurement circuitry 119. For this application, the control signal on lead 510 coincides with the beginning of bursts 205 and 206 while the control signal on lead 515 coincides with the ends of these bursts.

The relevant quantities in the control of the tap-weight coefficients are the set of N values of $e_n/b_n$. We can express this set of complex quantities in magnitude and phase form as $$\left\{\frac{e_n}{b_n}\right\} = \left\{\left|\frac{e_n}{b_n}\right|, (\phi_{ne} - \phi_{nb})\right\}$$

where $n=1, 2 \ldots N$ and where $\phi_{ne}$ and $\phi_{nb}$ are the phases of $e_n$ and $b_n$, respectively, relative to the sinusoidal waveform generated by local oscillator 504.

The quantity $e_n$ measured during burst 203 or 205 can be expressed as $$e_n = X_n + jY_n = K_1[\cos(\phi_{ne}-L) + j\sin(\phi_{ne}-L)] \quad (14)$$

where $K_1$ is the magnitude of $e_n$ and L is the local oscillator phase. During burst 204 or 205, the quantity measured is $$b_n = X'_n + jY'_n = K_2[\cos(\phi_{nb}-L) + j\sin(\phi_{nb}-L)] \quad (15)$$

where $K_2$ is the magnitude of $b_n$. We can safely assume that the measurement circuitry remains stable over either two successive H-POL bursts or two successive V-POL bursts, i.e., L is constant and so are $K_1$ and $K_2$.

Figure 7:
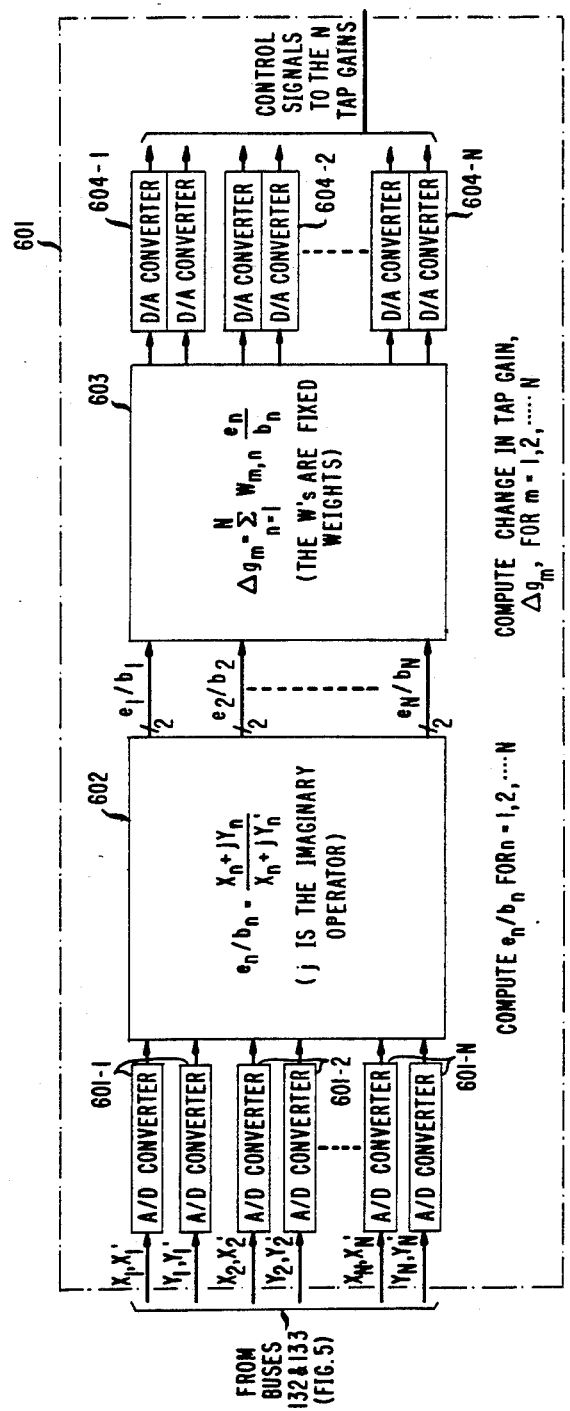
FIG. 7 is a schematic block diagram of a portion of the compute/control circuitry within the canceller of FIG. 1.

FIG. 7 shows a block-schematic diagram of the portion 601 of compute/control circuit 121 of FIG. 1 which adjusts the tap-weight coefficients of adaptive filter 114 via bus 124 in response to measurement data from measurement circuitry 120. A second portion of compute/control circuit 121 (not shown), identical to portion 601, receives data from measurement circuitry 119 and adjusts the tap-weight coefficients of adaptive filter 113 via bus 124.

Referring to FIG. 7, quadrature-related components $X_n$, $Y_n$ of $e_n$ and $X'_n$, $Y'_n$ of $b_n$ are each assigned to one of a plurality of discrete levels by A/D converter pairs 601-1 through 601-N. Components $X_n$, $X'_n$ are supplied to a first A/D converter in each A/D converter pair and components $Y_n$, $Y'_n$ are supplied to a second A/D converter in each A/D converter pair. The outputs of these A/D converters are then supplied to arithmetic unit 602 which calculates the magnitude and phase of the complex quantity $e_n/b_n$ for $n=1, 2, \ldots N$, wherein the magnitude of $e_n/b_n$ can be expressed in terms of $X_n$, $Y_n$, $X'_n$ and $Y'_n$ as $$\frac{e_n}{b_n} = \sqrt{\frac{X_n^2 + Y_n^2}{(X'_n)^2 + (Y'_n)^2}} \; ; \quad (16)$$

and the phase of $e_n/b_n$, i.e., the phase of $e_n$ relative to $b_n$, can be expressed as $$\phi_{ne} - \phi_{nb} = \tan^{-1}\left[\frac{X'_n Y_n - Y'_n X_n}{X_n X'_n + Y_n Y'_n}\right] \quad (17)$$

Computing the magnitude and phase of $e_n/b_n$ in accordance with equations (16) and (17) can be readily provided by a microprocessor. For the phase relationship in accordance with equation (17), a ROM in arithmetic unit 602 can be advantageously utilized to store an inverse-tangent table.

The complex quantities $e_1/b_1, e_2/b_2 \ldots e_N/b_N$ formed by arithmetic unit 602 are supplied to arithmetic unit 603. Unit 603 computes the changes in each of the N tap-weight coefficients of adaptive filter 114 wherein the change in the $m^{th}$ tap-weight coefficient, $\Delta g_m$, can be expressed as $$\Delta g_m = \sum_{n=1}^{N} W_{m,n} \frac{e_n}{b_n} \; ; \quad (18)$$

where $m=1, 2 \ldots N$. The $W_{m,n}$ terms are fixed weights stored in unit 603 and each $W_{m,n}$ is the (m,n) element of the inverse of the $N \times N$ matrix whose (n,m) element is $e^{-j2\pi f_n \tau_m}$ and discussed, supra, relative to equation (9). The N $\Delta g_m$s computed by unit 603 are coupled through a D/A converter pair 604-1 through 604-N where they are assigned to discrete values and are then coupled via bus 124 to adaptive filter 114. Each of the D/A converter pairs receives a different $g_m$. D/A converter pairs 604-1 through 604-N can be eliminated if each tap-weight multiplier in the adaptive filters accepts a pair of digital signals.

It should, of course, be understood that while the present invention has been described in reference to a particular communications system, numerous other embodiments may be envisioned by those skilled in the art without departing from the spirit and scope of the present invention. First, for example, the present invention is not limited to QAM modulation and can be utilized with any of a number of different modulation formats. Second, while the same sequences of digital signal values are advantageously utilized for the H-POL and V-POL bursts, different sequences of signal values either yielding different sets of spectral tones may be used or having other probing capabilities may be used. Third, while two arithmetic units 602 and 603 are shown, the mathematical transformations provided therein can be incorporated into a single microprocessor. Lastly, while each of the adaptive filters disclosed includes a tapped delay line, other filter structures, such as parallel bandpass filter banks, can be utilized.

What is claimed is:

1. Apparatus for cancelling cross-polarization interference in orthogonally polarized first and second incoming signals, said apparatus comprising
   first and second adaptive filters for filtering respective ones of said incoming signals, each of said filters having a frequency response determined by a plurality of weighting coefficients,
   means for adding the filtered first incoming signal and said second incoming signal and for adding said filtered second incoming signal and said first incoming signal to form respective output signals, and
   means for adjusting said weighting coefficients of each filter in response to said incoming signals and to said output signals at selected times.

2. The apparatus of claim 1 wherein said incoming signals at said selected times comprise predetermined repetitive sequences of digital signals.

3. The apparatus of claim 1 wherein each of said incoming and output signals has a frequency spectrum which, at times, comprises a plurality of spectral tones, said spectral tones for any one of said incoming signals and a corresponding one of said output signals being at a common set of frequencies.

4. The apparatus of claim 3 wherein said adjusting means examines said spectral tones at said common set of frequencies.

5. The apparatus of claim 4 wherein said adjusting means forms ratios of the spectral tones of said output signals to the spectral tones of said incoming signals at each spectral tone frequency.

6. The apparatus of claim 5 wherein said adjusting means forms a linear combination of said ratios.

7. The apparatus of claim 6 wherein each ratio in said linear combination is weighted by an associated constant.

8. The apparatus of claim 7 wherein each associated constant is a preselected function of the frequencies of said spectral tones.

9. The apparatus of claim 8 wherein said adaptive filters each comprises a tapped delay line having a plurality of tap-weight coefficients.

10. The apparatus of claim 9 wherein said coefficients are altered by said adjusting means in response to said linear combination of spectral tone ratios.

11. A method of cancelling cross-polarization interference in first and second incoming signals having polarizations which are orthogonal to one another, said method comprising the steps of coupling each of said incoming signals through a respective adaptive filter, each having a frequency response determined by a plurality of weighting coefficients, adding the filtered first incoming signal and said second incoming signal and adding the filtered second incoming signal and said first incoming signal to form output signals, and adjusting said weighting coefficients of said adaptive filters in response to said output signals and said incoming signals at selected times.

* * * * *